United States Patent Office 2,852,527
Patented Sept. 16, 1958

2,852,527

2-LOWER-ALKYL-3-CARBO-LOWER-ALKOXY-5-HYDROXY-6-TERTIARY-AMINOINDOLES AND PREPARATION THEREOF

Edgar Alfred Steck, Albany, N. Y., assignor to Sterling Drug Inc., New York, N. Y., a corporation of Delaware No Drawing. Application June 4, 1956
Serial No. 588,993

20 Claims. (Cl. 260—319)

This invention relates to substituted indoles and preparation thereof. In particular the invention is concerned with 2-lower-alkyl-3-carbo-lower-alkoxy-5-hydroxyindoles having a basic tertiary-aminomethyl group in the 6-position, and to acid-addition salts thereof. The invention is also concerned with a process for preparing the aforesaid compounds and with intermediates in the preparation thereof, and with the preparation of said intermediates.

Among the compounds of my invention are those represented by the following formula:

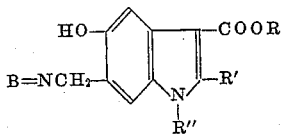

wherein R and R' are lower-alkyl groups, R" is hydrogen or a lower-alkyl or phenyl-lower-alkyl group, and B=N is a basic tertiary-amino group.

In the above general Formula I, the lower-alkyl groups R and R', and R", when a lower-alkyl group, each have from 1 to about 8 carbon atoms. The alkyl groups can be the same or different, straight or branched chained, and thus include such groups as methyl, ethyl, propyl, isopropyl, butyl, isobutyl, tertiary-butyl, pentyl, hexyl, heptyl, octyl, and the like.

The substituent on the ring nitrogen, R", can represent a hydrogen atom, or a lower-alkyl or phenyl-substituted lower-alkyl group having from 1 to about 10 carbon atoms, thus including such groups as benzyl, 2-phenylethyl, 1-phenylethyl, 3-phenylpropyl, 2-phenylpropyl, 4-phenylbutyl, and the like.

In the above general Formula I, B=N represents a basic tertiary-amino group. The exact nature of the tertiary-amino group is not critical, provided it is basic in character. It preferably has a molecular weight below about 200 so that the acid-addition salts will have an appreciable water-solubility. A particularly preferred group of tertiary-amino groups is the group consisting of di-lower-alkylamino groups, and 1-piperidyl, 1-pyrrolidyl and 4-morpholinyl groups, and lower-alkylated derivatives of the latter three. In the di-lower-alkylamino groups, the lower-alkyl groups have from 1 to 6 carbon atoms, and thus the di-lower-alkylamino groups include such groups as dimethylamino, methylethylamino, diethylamino, dipropylamino, diisopropylamino, dibutylamino, dipentylamino, dihexylamino, and the like.

Among the intermediates useful in preparing compounds of Formula I, and forming a part of my invention, are compounds of the following formula:

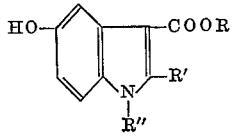

wherein R and R' are lower-alkyl groups, and R" is a lower-alkyl group or a phenyl-lower-alkyl group.

The process forming a part of my invention is illustrated with respect to the compounds of Formula I by the following equations:

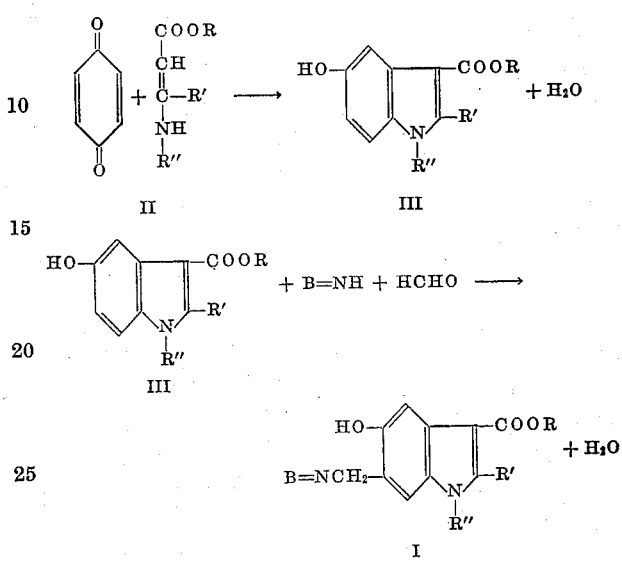

Benzoquinone is treated with a β-aminocrotonic acid ester (II), preferably in the presence of a solvent inert under the conditions of the reaction, such as acetone, to give a 2-lower-alkyl-3-carbo-lower-alkoxy-5-hydroxyindole having the Formula III, wherein R, R' and R" have the meanings given above. The reaction takes place slowly at room temperature, although heating at a temperature between about 50° C. and 150° C. is desirable to speed up the reaction and ensure its completion. Approximately equimolar quantities of benzoquinone and aminocrotonate are used. For introduction of the 6-aminomethyl group, the intermediate indoles of formula III are treated with a secondary amine, B=NH, and formaldehyde. The reaction takes place either in the absence or the presence of an inert solvent, including, for instance, ethanol, methanol, dioxane, acetic acid, and the like, and occurs slowly at room temperature, although heating at a temperature between about 50° C. and 150° C. is desirable to speed up the reaction and ensure its completion. At least equimolar quantities and preferably an excess of secondary amine and formaldehyde are used relative to the indole reactant.

The intermediate β-aminocrotonic acid esters are a known class of compounds and are prepared by condensing an alkyl acylacetate, R'COCH$_2$COOR, with a primary amine, R"NH.

The structure of the compounds of the invention is established by the mode of synthesis and by chemical analysis. The assignment of the tertiary-aminomethyl group to the 6-position of the indole nucleus is based on steric considerations.

The compounds of the invention are most conveniently used in the form of water-soluble acid-addition salts, and these salts are also within the purview of the invention. The acids which can be used to prepare acid-addition salts are those which produce when combined with the tertiary-amines, salts whose anions are relatively innocuous to the animal organism in therapeutic doses of the salts, so that the beneficial physiological properties inherent in the tertiary-amines are not vitiated by side-effects ascribable to the anions. Appropriate acid-addition salts are those derived from mineral acids such as hydrochloric acid, hydrobromic acid, hydriodic acid, and sulfuric acid and phosphoric acid; and organic acids such as acetic acid, citric acid, tartaric acid, quinic acid, lactic acid, and methanesulfonic acid. Only mono-acid-addition salts can be produced, involving the nitrogen atom of the tertiary-aminomethyl group, since the nitrogen atom of the indole nucleus is not basic in character.

The following examples will illustrate the invention without limiting the same thereto.

Example 1

(a) 1,2-dimethyl-3-carbethoxy-5-hydroxyindole [III; R is $C_2H_5$, R' and R" are $CH_3$]:

A refluxing solution of 69.2 g. (0.64 mole) of 1,4-benzoquinone in 500 ml. of acetone was stirred under nitrogen, and 85.6 g. (0.60 mole) of ethyl β-methylaminocrotonate was added. The solution was refluxed for two and one-half hours, after which time the volume of the mixture had decreased to about 200 ml. through entrainment of acetone with the stream of nitrogen. The mixture was cooled, the solid material was collected by filtration and stirred with 150 ml. of acetone at —10° C. The product was again collected by filtration, washed with cold acetone and dried, giving 45.3 g. of 1,2-dimethyl-3-carbethoxy-5-hydroxyindole, M. P. 210–212° C. The analytic sample was recrystallized from 2-methoxyethanol and had the M. P. 212–214° C.

Analysis.—Calcd. for $C_{13}H_{15}NO_3$: C, 66.93; H. 6.48; N, 6.00. Found: C, 66.91; H, 6.44; N, 6.19.

(b) 1,2-dimethyl-3-carbethoxy-5-hydroxy-6-dimethylaminomethylindole [I; R is $C_2H_5$, R' and R" are $CH_3$, B=N is $(CH_3)_2N$]:

To a mixture of 10 ml. of glacial acetic acid and 7.5 g. (0.05 mole) of 30% aqueous dimethylamine solution was added 4.0 g. (0.05 mole) and 37% aqueous formaldehyde solution at room temperature, and then 10.4 g. (0.045 mole) of 1,2-dimethyl-3-carbethoxy-5-hydroxyindole was added to the mixture with stirring. The mixture was diluted with 10 ml. of glacial acetic acid and heated to 90° C. The mixture was kept at 90° C. for about ten minutes and then allowed to cool to room temperature and finally chilled in ice. The mixture was then poured into about 500 ml. of ice water and made slightly basic with sodium hydroxide solution. The solid which separated was collected by filtration and recrystallized from ethanol, giving 6.8 g. of 1,2-dimethyl-3-carbethoxy-5-hydroxy-6-dimethylaminomethylindole, M. P. 135–138° C.

A sample of 1,2-dimethyl-3-carbethoxy-5-hydroxy-6-dimethylaminomethylindole was dissolved in ether and an excess of ethereal hydrogen chloride was added. The solid salt which separated was collected by filtration and recrystallized twice from an isopropyl alcohol-ether mixture. There was thus obtained 1,2-dimethyl-3-carbethoxy-5-hydroxy-6-dimethylaminomethylindole hydrochloride in the form of colorless needles, M. P. 203–204° C. (dec.).

Analysis.—Calcd. for $C_{16}H_{22}N_2O_3 \cdot HCl$: N, 8.57; Cl, 10.85. Found: N, 8.40; Cl, 10.90.

By replacement in the preceding preparation of the hydrogen chloride by a molar equivalent amount of hydrogen bromide, hydrogen iodide, sulfuric acid, phosphoric acid, citric acid, tartaric acid, quinic acid, or methanesulfonic acid, there can be obtained, respectively, the hydrobromide, hydriodide, sulfate (or bisulfate), phosphate (or acid phosphate), citrate (or acid citrate), tartrate (or bitartrate), quinate, or methanesulfonate salts of 1,2-dimethyl-3-carbethoxy-5-hydroxy-6-dimethylaminomethylindole.

1,2-dimethyl-3-carbethoxy-5-hydroxy-6-dimethylaminomethylindole, when administered subcutaneously to cats at a dose level of 5–15 mg./kg. of body weight produced marked central nervous system stimulation as evidenced by excitement, salivation, vocalization, etc. The approximate subcutaneous toxicity ($ALD_{50}$) in cats was 21 mg./kg. The compound also showed marked anorexigenic activity in cats, being one-third to one-half as potent as desoxyephedrine.

Example 2

(a) Ethyl β-benzylaminocrotonate [II; R is $C_2H_5$, R' is $CH_3$, R" is $C_6H_5CH_2$]:

Benzylamine (390 g., 3.64 mole) was added in small portions during thirty minutes to 475 g. of ethyl acetoacetate with vigorous stirring while maintaining the temperature at about 50° C. with external cooling. The mixture was allowed to stand at room temperature for about fifteen hours, the water layer which had separated was drawn off and the organic layer was dried over anhydrous sodium sulfate. The product was distilled in vacuo, giving 656 g. of ethyl β-benzylaminocrotonate, B. P. 129° C. (0.4 mm.), $n_D^{25}$ =1.5554.

Analysis.—Calcd. for $C_{13}H_{17}NO_2$: C, 71.21; H, 7.82; N, 6.39. Found: C, 71.05; H, 7.70; N, 6.41.

By replacement of the ethyl acetoacetate in the preceding preparation by a molar equivalent amount of methyl acetoacetate, propyl acetoacetate, isopropyl acetoacetate, hexyl acetoacetate, ethyl 3-oxopentanoate, ethyl 3-oxohexanoate, ethyl 3-oxoheptanoate, ethyl 3-oxo-4-methylhexanoate, or ethyl 3-oxodecanoate, there can be obtained, respectively, methyl β-benzylaminocrotonate [II; R and R' are $CH_3$, R" is $C_6H_5CH_2$], propyl β-benzylaminocrotonate [II; R is n-$C_3H_7$, R' is $CH_3$, R" is $C_6H_5CH_2$], isopropyl β-benzylaminocrotonate [II; R is $CH(CH_3)_2$, R' is $CH_3$, R" is $C_6H_5CH_2$], hexyl β-benzylaminocrotonate [II; R is n-$C_6H_{13}$, R' is $CH_3$, R" is $C_6H_5CH_2$], ethyl 3-benzylamino-2-pentenoate [II; R and R' are $C_2H_5$, R" is $C_6H_5CH_2$], ethyl 3-benzylamino-2-hexenoate [II; R is $C_2H_5$, R' is n-$C_3H_7$, R" is $C_6H_5CH_2$], ethyl 3-benzylamino-2-heptenoate [II; R is $C_2H_5$, R' is n-$C_4H_9$, R" is $C_6H_5CH_2$], ethyl 3-benzylamino-4-methyl-2-hexenoate [II; R is $C_2H_5$, R' is $CH(CH_3)CH_2CH_3$, R" is $C_6H_5CH_2$], or ethyl 3-benzylamino-2-decenoate [II; R is $C_2H_5$, R' is n-$C_7H_{15}$, R" is $C_6H_5CH_2$].

By replacement of the benzylamine in the preceding preparation by a molar equivalent amount of ethylamine, isopropylamine, octylamine, 2 - phenylethylamine, 3 - phenylpropylamine, 2-phenylpropylamine, or 4-phenylbutylamine, there can be obtained, respectively, ethyl β-ethylaminocrotonate [II; R is $C_2H_5$, R' is $CH_3$, R" is $C_2H_5$], ethyl β-isopropylaminocrotonate [II; R is $C_2H_5$, R' is $CH_3$, R" is $CH(CH_3)_2$], ethyl β-octylaminocrotonate [II; R is $C_2H_5$, R' is $CH_3$, R" is n-$C_8H_{17}$], ethyl β-(2-phenylethylamino)crotonate [II; R is $C_2H_5$, R' is $CH_3$, R" is $C_6H_5CH_2CH_2$], ethyl β-(3-phenylpropylamino)crotonate [II; R is $C_2H_5$, R' is $CH_3$, R" is $C_6H_5CH_2CH_2CH_2$], ethyl β-(2-phenylpropylamino)crotonate [II; R is $C_2H_5$, R' is $CH_3$, R" is $C_6H_5CH(CH_3)CH_2$]

or ethyl β-(4-phenylbutylamino)crotonate [II; R is $C_2H_5$, R' is $CH_3$, R" is $C_6H_5CH_2CH_2CH_2CH_2$].

(b) 1-benzyl-2-methyl-3-carbethoxy-5-hydroxyindole [III; R is $C_2H_5$, R' is $CH_3$, R" is $C_6H_5CH_2$]:

A mixture of 600 ml. of acetone, 175 g. (0.80 mole) of ethyl β-benzylaminocrotonate and 85 g. (0.79 mole) of 1,4-benzoquinone was stirred and heated at gentle reflux under an atmosphere of nitrogen for two and one-half hours. The mixture was then concentrated by distillation until the internal temperature reached 90° C., and the residue was diluted with 200 ml. of acetone and cooled to 0° C. The solid product which separated was collected by filtration, washed with a small amount of cold acetone and air-dried, giving 53 g. of 1-benzyl-2-methyl-3-carbethoxy-5-hydroxyindole, M. P. 195–196° C. After two recrystallizations from ethyl acetate, a sample of the compound was obtained having the M. P. 196–197.5° C.

*Analysis.*—Calcd. for $C_{19}H_{19}NO_3$: C, 73.77; H, 6.19; O, 15.52. Found: C, 73.92; H, 6.17; O, 15.85.

By replacement of the ethyl β-benzylaminocrotonate in the preceding preparation by a molar equivalent amount of methyl β-benzylaminocrotonate, propyl β-benzylaminocrotonate, isopropyl β-benzylaminocrotonate, hexyl β-benzylaminocrotonate, ethyl 3-benzylamino-2-pentenoate, ethyl 3-benzylamino-2-hexenoate, ethyl 3-benzylamino-2-heptenoate, ethyl 3-benzylamino-4-methyl-2-hexenoate, ethyl 3-benzylamino-2-decenoate, ethyl β-ethylaminocrotonate, ethyl β-isopropylaminocrotonate, ethyl β-octylaminocrotonate, ethyl β-(2-phenylethylamino)crotonate, ethyl β-(3-phenylpropylamino)crotonate, ethyl β-(2-phenylpropylamino)-crotonate, or ethyl β-(4-phenylbutylamino)crotonate, there can be obtained, respectively, 1-benzyl-2-methyl-3-carbomethoxy-5-hydroxyindole [III; R and R' are $CH_3$, R″ is $C_6H_5CH_2$], 1-benzyl-2-methyl-3-carbopropoxy-5-hydroxyindole [III; R is n-$C_3H_7$, R' is $CH_3$, R″ is $C_6H_5CH_2$], 1-benzyl-2-methyl-3-carboisopropoxy-5-hydroxyindole [III; R is $CH(CH_3)_2$, R' is $CH_3$, R″ is $C_6H_5CH_2$], 1-benzyl-2-methyl-3-carbohexoxy-5-hydroxyindole [III; R is n-$C_6H_{13}$, R' is $CH_3$, R″ is $C_6H_5CH_2$], 1-benzyl-2-ethyl-3-carbethoxy-5-hydroxyindole [III; R and R' are $C_2H_5$, R″ is $C_6H_5CH_2$], 1-benzyl-2-propyl-3-carbethoxy-5-hydroxyindole [III; R is $C_2H_5$, R' is n-$C_3H_7$, R″ is $C_6H_5CH_2$], 1-benzyl-2-butyl-3-carbethoxy-5-hydroxyindole [III; R is $C_2H_5$, R' is n-$C_4H_9$, R″ is $C_6H_5CH_2$], 1-benzyl-2-(1-methylpropyl)-3-carbethoxy-5-hydroxyindole [III; R is $C_2H_5$, R' is $CH(CH_3)CH_2CH_3$, R″ is $C_6H_5CH_2$], 1-benzyl-2-heptyl-3-carbethoxy-5-hydroxyindole [III; R is $C_2H_5$, R' is n-$C_7H_{15}$, R″ is $C_6H_5CH_2$], 1-ethyl-2-methyl-3-carbethoxy-5-hydroxyindole [III; R is $C_2H_5$, R' is $CH_3$, R″ is $C_2H_5$], 1-isopropyl-2-methyl-3-carbethoxy-5-hydroxyindole [III; R is $C_2H_5$, R' is $CH_3$, R″ is $CH(CH_3)_2$], 1-octyl-2-methyl-3-carbethoxy-5-hydroxyindole [III; R is $C_2H_5$, R' is $CH_3$, R″ is n-$C_8H_{17}$], 1-(2-phenylethyl)-2-methyl-3-carbethoxy-5-hydroxyindole [III; R is $C_2H_5$, R' is $CH_3$, R″ is $C_6H_5CH_2CH_2$], 1-(3-phenylpropyl)-2-methyl-3-carbethoxy-5-hydroxyindole [III; R is $C_2H_5$, R' is $CH_3$, R″ is $C_6H_5CH_2CH_2CH_2$], 1-(2-phenylpropyl)-2-methyl-3-carbethoxy-5-hydroxyindole [III; R is $C_2H_5$, R' is $CH_3$, R″ $C_6H_5CH(CH_3)CH_2$], or 1-(4-phenylbutyl)-2-methyl-3-carbethoxy-5-hydroxyindole [III; R is $C_2H_5$, R' is $CH_3$, R″ is $C_6H_5CH_2CH_2CH_2CH_2$].

(c) 1-benzyl-2-methyl-3-carbethoxy-5-hydroxy-6-dimethylaminomethylindole [I; R is $C_2H_5$, R' is $CH_3$, R″ is $C_6H_5CH_2$, B=N is $(CH_3)_2N$]:

A mixture of 6 g. of 37% aqueous formaldehyde solution, 13.5 g. of 5.9 N aqueous dimethylamine solution and 375 ml. of glacial acetic acid was added to 23.4 g. of 1-benzyl-2-methyl-3-carbethoxy-5-hydroxyindole at 0° C. The resultant solution was warmed briefly to 70° C. and then allowed to stand at room temperature for six days. The reaction mixture was concentrated to one-half of its original volume, then diluted with 750 ml. of cold water and rendered strongly basic by the addition of an excess of 10% sodium hydroxide solution. The supernatant liquid was decanted from a gummy solid which had separated, and the liquid was extracted with 300 ml. of benzene. The gummy solid was dissolved in the benzene extract and the solution evaporated under reduced pressure. The residue was crystallized from 700 ml. of n-hexane, giving 22.5 g. of 1-benzyl-2-methyl-3-carbethoxy-5-hydroxy-6-dimethylaminomethylindole, M. P. 108–110° C. A recrystallization from hexane gave a sample of the compound having the M. P. 109–110° C.

*Analysis.*—Calcd. for $C_{22}H_{26}N_2O_3$: N(basic), 3.82. Found: N(basic), 3.71.

A stream of dry hydrogen chloride gas was passed over the surface of a vigorously stirred solution of 31.0 g. of 1-benzyl-2-methyl-3-carbethoxy-5-hydroxy-6-dimethylaminomethylindole in 1 liter of absolute ether. The reaction mixture was kept at 0° C. for three days, and the solid product was collected by filtration, giving 32.6 g. of the hydrochloride salt of 1-benzyl-2-methyl-3-carbethoxy-5-hydroxy-6-dimethylaminomethylindole. The compound was recrystallized by dissolving it in 300 ml. of absolute ethanol, treating the solution with activated charcoal for decolorizing purposes, filtering the solution while hot, and adding 200 ml. of absolute ether to the filtrate. There was thus obtained 25.5 g. of the hydrochloride salt, M. P. 234–235° C. (dec.).

*Analysis.*—Calcd. for $C_{22}H_{26}N_2O_3 \cdot HCl$: C, 65.42; H, 6.74; Cl, 8.78. Found: C, 65.39; H, 6.68; Cl, 8.44.

By replacement of the dimethylamine in the preceding preparation by a molar equivalent amount of diethylamine, methylethylamine, dipropylamine, diisopropylamine, dibutylamine, dihexylamine, piperidine, pyrrolidine, morpholine, 2-methylpiperidine, 3-ethylpyrrolidine, or 2,3-dimethylmorpholine, there can be obtained, respectively, 1-benzyl-2-methyl-3-carbethoxy-5-hydroxy-6-diethylaminomethylindole [I; R is $C_2H_5$, R' is $CH_3$, R″ is $C_6H_5CH_2$, B=N is $(C_2H_5)_2N$], 1-benzyl-2-methyl-3-carbethoxy-5-hydroxy-6-methylethylaminomethylindole [I; R is $C_2H_5$, R' is $CH_3$, R″ is $C_6H_5CH_2$, B=N is $(CH_3)(C_2H_5)N$], 1-benzyl-2-methyl-3-carbethoxy-5-hydroxy-6-dipropylaminomethylindole [I; R is $C_2H_5$, R' is $CH_3$, R″ is $C_6H_5CH_2$, B=N is (n-$C_3H_7)_2N$], 1-benzyl-2-methyl-3-carbethoxy-5-hydroxy-6-diisopropylaminomethylindole [I; R is $C_2H_5$, R' is $CH_3$, R″ is $C_6H_5CH_2$, B=N is $[(CH_3)_2CH]_2N$], 1-benzyl-2-methyl-3-carbethoxy-5-hydroxy-6-dibutylaminomethylindole [I; R is $C_2H_5$, R' is $CH_3$, R″ is $C_6H_5CH_2$, B=N is (n-$C_4H_9)_2N$], 1-benzyl-2-methyl-3-carbethoxy-5-hydroxy-6-dihexylaminomethylindole [I; R is $C_2H_5$, R' is $CH_3$, R″ is $C_6H_5CH_2$, B=N is (n-$C_6H_{13})_2N$], 1-benzyl-2-methyl-3-carbethoxy-5-hydroxy-6-(1-piperidylmethyl)indole [I; R is $C_2H_5$, R' is $CH_3$, R″ is $C_6H_5CH_2$, B=N is $C_5H_{10}N$], 1-benzyl-2-methyl-3-carbethoxy-5-hydroxy-6-(1-pyrrolidylmethyl)indole [I; R is $C_2H_5$, R' is $CH_3$, R″ is $C_6H_5CH_2$, B=N is $C_4H_8N$], 1-benzyl-2-methyl-3-carbethoxy-5-hydroxy-6-(4-morpholinylmethyl)-indole [I; R is $C_2H_5$, R' is $CH_3$, R″ is $C_6H_5CH_2$, B=N is $OC_4H_8N$], 1-benzyl-2-methyl-3-carbethoxy-5-hydroxy-6-(2-methyl-1-piperidylmethyl)indole [I; R is $C_2H_5$, R' is $CH_3$, R″ is $C_6H_5CH_2$, B=N is 2-$CH_3C_4H_9N$], 1-benzyl-2-methyl-3-carbethoxy-5-hydroxy-6-(3-ethyl-1-pyrrolidylmethyl)-indole [I; R is $C_2H_5$, R' is $CH_3$, R″ is $C_6H_5CH_2$, B=N is 3-$C_2H_5$—$C_5H_9N$], or 1-benzyl-2-methyl-3-carbethoxy-5-hydroxy-6-(2,3-dimethyl-4-morpholinylmethyl)indole [I; R is $C_2H_5$, R' is $CH_3$, R″ is $C_6H_5CH_2$, B=N is 2,3-$(CH_3)_2$—$OC_4H_7N$].

By replacement of the 1-benzyl-2-methyl-3-carbethoxy-5-hydroxyindole in the preceding preparation by a molar equivalent amount of 1-benzyl-2-methyl-3-carbomethoxy-5-hydroxyindole, 1-benzyl-2-methyl-3-carbopropoxy-5-hydroxyindole, 1-benzyl-2-methyl-3-carboisopropoxy-5-hydroxyindole, 1-benzyl-2-methyl-3-carbohexoxy-5-hydroxyindole, 1-benzyl-2-ethyl-3-carbethoxy-5-hydroxyindole, 1-benzyl-2-propyl-3-carbethoxy-5-hydroxyindole, 1-benzyl-2-butyl-3-carbethoxy-5-hydroxyindole, 1-benzyl-2-(1-methylpropyl)-3-carbethoxy-5-hydroxyindole, 1-benzyl-2-heptyl-3-carbethoxy-5-hydroxyindole, 1-ethyl-2-methyl-3-carbethoxy-5-hydroxyindole, 1-isopropyl-2-methyl-3-carbethoxy-5-hydroxyindole, 1-octyl-2-methyl-3-carbethoxy-5-hydroxyindole, 1-(2-phenylethyl)-2-methyl-3-carbethoxy-5-hydroxyindole, 1-(3-phenylpropyl)-2-methyl-3-carbethoxy-5-hydroxyindole, 1-(2-phenylpropyl)-2-methyl-3-carbethoxy-5-hydroxyindole, or 1-(4-phenylbutyl)-2-methyl-3-carbethoxy-5-hydroxyindole, there can be obtained, respectively 1-benzyl-2-methyl-3-carbomethoxy-5-hydroxy-6-dimethylaminomethylindole [I; R and R' are $CH_3$, R″ is $C_6H_5CH_2$, B=N is $(CH_3)_2N$], 1-benzyl-2-methyl-3-carbopropoxy-5-hydroxy-6-dimethylaminomethylindole [I; R is n-$C_3H_7$, R' is $CH_3$, R″ is $C_6H_5CH_2$, B=N is $(CH_3)_2N$], 1-benzyl-2-methyl-3-carboisopropoxy-5-hydroxy-6-dimethylaminomethylindole [I; R is $CH(CH_3)_2$, R' is $CH_3$, R″ is $C_6H_5CH_2$, B=N is (CH$_3$)$_2$N], 1-benzyl-2-methyl-3-carbohexoxy-5-hydroxy-6-dimethylaminomethylindole [I; R is n-C$_6$H$_{13}$, R' is CH$_3$, R" is C$_6$H$_5$CH$_2$, B=N is (CH$_3$)$_2$N], 1-benzyl-2-ethyl-3-carbethoxy-5-hydroxy - 6 - dimethylaminomethylindole [I; R and R' are C$_2$H$_5$, R" is C$_6$H$_5$CH$_2$, B=N is (CH$_3$)$_2$N], 1-benzyl-2-propyl-3-carbethoxy-5-hydroxy-6-dimethylaminomethylindole [I; R is C$_2$H$_5$, R' is n-C$_3$H$_7$, R" is C$_6$H$_5$CH$_2$, B=N is (CH$_3$)$_2$N], 1-benzyl-2-butyl-3-carbethoxy-5-hydroxy-6-dimethylaminomethylindole [I; R is C$_2$H$_5$, R' is n-C$_4$H$_9$, R" is C$_6$H$_5$CH$_2$, B=N is (CH$_3$)$_2$N], 1-benzyl-2-(1-methylpropyl)-3-carbethoxy-5-hydroxy-6-dimethylaminomethylindole [I; R is C$_2$H$_5$, R' is CH(CH$_3$)CH$_2$CH$_3$, R" is C$_6$H$_5$CH$_2$, B=N is (CH$_3$)$_2$N], 1-benzyl-2-heptyl-3-carbethoxy-5-hydroxy-6-dimethylaminomethylindole [I; R is C$_2$H$_5$, R' is n-C$_7$H$_{15}$, R" is C$_6$H$_5$CH$_2$, B=N is (CH$_3$)$_2$N], 1-ethyl-2-methyl-3-carbethoxy-5-hydroxy-6-dimethylaminomethylindole [I; R is C$_2$H$_5$, R' is CH$_3$, R" is C$_2$H$_5$, B=N is (CH$_3$)$_2$N], 1-isopropyl-2-methyl-3-carbethoxy - 5 - hydroxy-6-dimethylaminomethylindole [I; R is C$_2$H$_5$, R' is CH$_3$, R" is CH(CH$_3$)$_2$, B=N is (CH$_3$)$_2$N], 1-octyl-2-methyl-3-carbethoxy-5-hydroxy-6-dimethylaminomethylindole [I; R is C$_2$H$_5$, R' is CH$_3$, R" is n-C$_8$H$_{17}$, B=N is (CH$_3$)$_2$N], 1-(2-phenylethyl)-2-methyl-3-carbethoxy - 5 - hydroxy-6-dimethylaminomethylindole [I; R is C$_2$H$_5$, R' is CH$_3$, R" is C$_6$H$_5$CH$_2$CH$_2$, B=N is (CH$_3$)$_2$N], 1-(3-phenylpropyl)-2-methyl-3-carbethoxy - 5 - hydroxy-6-dimethylaminomethylindole [I; R is C$_2$H$_5$, R' is CH$_3$, R" is C$_6$H$_5$CH$_2$CH$_2$CH$_2$, B=N is (CH$_3$)$_2$N], 1-(2-phenylpropyl)-2-methyl-3-carbethoxy - 5 - hydroxy-6-dimethylaminomethylindole [I; R is C$_2$H$_5$, R' is CH$_3$, R" is C$_6$H$_5$CH(CH$_3$)CH$_2$, B=N is (CH$_3$)$_2$N], or 1-(4-phenylbutyl)-2-methyl - 3 - carbethoxy - 5 - hydroxy-6-dimethylaminomethylindole [I; R is C$_2$H$_5$, R' is CH$_3$, R" is C$_6$H$_5$CH$_2$CH$_2$CH$_2$CH$_2$, B=N is (CH$_3$)$_2$N].

Example 3

(a) Ethyl β-hexylaminocrotonate [II; R is C$_2$H$_5$, R' is CH$_3$, R" is n-C$_6$H$_{13}$]:

Hexylamine (212 g., 2.1 mole) was added over a period of two and one-half hours to 260.3 g. (2.0 mole) of ethyl acetoacetate with stirring. The temperature was held at 43–46° C. by appropriate control of the addition of the amine. The reaction mixture was allowed to stand at room temperature for about fifteen hours and then heated at 90–95° C. for two hours. The solution was dried over anhydrous sodium sulfate and then fractionated, giving 393.6 g. of ethyl β-hexylaminocrotonate, B. P. 107–110° C. (0.2 mm.), $n_D^{25}$=1.4852.

*Analysis.*—Calcd. for C$_{12}$H$_{23}$NO$_2$: C, 67.57; H, 10.87; N, 6.57. Found: C, 67.48; H, 10.70; N, 6.60.

(b) 1-hexyl-2-methyl-3-carbethoxy-5-hydroxyindole [III; R is C$_2$H$_5$, R' is CH$_3$, R" is n-C$_6$H$_{13}$]:

Ethyl β-hexylaminocrotonate (213.3 g., 1.00 mole) was added during twenty minutes to a stirred, refluxing solution of 115.0 g. (1.07 mole) of 1,4-benzoquinone in 1.3 liters of acetone under an atmosphere of nitrogen. The reaction mixture was refluxed for two hours, then filtered and concentrated in vacuo to a volume of about 500 ml. The residue was cooled to 0° C. and the solid which separated was collected by filtration, washed with cold 1:10 acetone-pentane, then stirred with 500 ml. of pentane containing about 1% ethyl acetate and cooled to −5° C. There was thus obtained 74.3 g. of 1-hexyl-2-methyl-3-carbethoxy-5-hydroxyindole, M. P. 131–132° C. (dec.). Two recrystallizations from 8 liters of heptane gave 68.8 g., M. P. 134.5–135.5° C. (dec.). One additional recrystallization from about 3 liters of cyclohexane raised the melting point to 135–135.5° C.

*Analysis.*—Calcd. for C$_{18}$H$_{25}$NO$_3$: C, 71.28; H, 8.30; O, 15.83. Found C, 71.46; H, 8.19; O, 15.70.

(c) 1-hexyl-2-methyl-3-carbethoxy-5-hydroxy-6-dimethylaminomethylindole [I; R is C$_2$H$_5$, R' is CH$_3$, R" is n-C$_6$H$_{13}$, B=N is (CH$_3$)$_2$N]:

A mixture of 10.8 g. of 5.9 N aqueous dimethylamine solution, 4.9 g. of 37% aqueous formaldehyde solution and 25 ml. of glacial acetic acid was added to a stirred solution of 18.2 g. (0.06 mole) of 1-hexyl-2-methyl-3-carbethoxy-5-hydroxyindole in 125 ml. of glacial acetic acid at 65° C. The reaction mixture was heated at 55–58° C. for one hour and then allowed to stand at 25° C. for five days. The reaction mixture was concentrated in vacuo to remove most of the volatile solvents, about 100 ml. of water and about 100 ml. of methylene chloride were added to the residue, and the mixture was then made basic with an excess of sodium hydroxide solution. The mixture was shaken, the layers separated, and the aqueous phase extracted well with methylene chloride. After washing with saturated sodium chloride solution, the combined organic extracts were dried over anhydrous sodium sulfate and concentrated, giving 1-hexyl-2-methyl-3-carbethoxy-5-hydroxy-6-dimethylaminomethylindole as a brown oil (24.5 g.). The latter substance was dissolved in absolute ether, and the solution was treated with an excess of an ether solution of hydrogen chloride. There separated a crystalline solid which was separated and recrystallized several times from an acetone-ether mixture, giving 1-hexyl-2-methyl-3-carbethoxy-5-hydroxy-6-dimethylaminomethylindole hydrochloride, M. P. 182.5–183° C. (dec.).

Example 4

(a) 2-methyl-3-carbethoxy-5-hydroxyindole [III; R is C$_2$H$_5$, R' is CH$_3$, R" is H] was prepared from ethyl β-aminocrotonate and 1,4-benzoquinone in acetone according to the manipulative procedure described above in Example 1, part (a). The 2-methyl-3-carbethoxy-5-hydroxyindole thus obtained had the M. P. 206–206.5° C.

(b) 2 - methyl - 3 - carbethoxy - 5 - hydroxy - 6 - dimethylaminomethylindole hydrochloride [I; R is C$_2$H$_5$, R' is CH$_3$, R" is H, B=N is (CH$_3$)$_2$N]:

Paraformaldehyde (6.0 g., 0.20 mole) was added to a warm solution of 39.4 g. (0.18 mole) of 2-methyl-3-carbethoxy-5-hydroxyindole in 350 ml. of absolute ethanol, and the stirred mixture was refluxed while a stream of dry dimethylamine gas was passed through it for two and one-half hours. The reaction mixture was then allowed to stand at room temperature for about fifteen hours, and the bulk of the solvent was removed in vacuo. The residue was dissolved in 500 ml. of absolute ether, 200 ml. of absolute ethanol was added and dry hydrogen chloride bubbled through the solution for about fifteen minutes. Absolute ether was added to make the volume of the mixture 1 liter and the solid material was collected by filtration, giving 34.0 g. of 2-methyl-3-carbethoxy-5-hydroxy-6-dimethylaminomethylindole hydrochloride, M. P. 220–225° C. (dec.). After two recrystallizations from ethanol-ether, a sample of the compound was obtained with the M. P. 224.5–225° C. (dec.).

*Analysis.*—Calcd. for C$_{15}$H$_{20}$N$_2$O$_3$.HCl: N, 8.96; Cl, 11.33. Found: N, 9.03; Cl, 11.07.

Pharmacological evaluation of the compounds of the invention having the formula I has demonstrated that they possess central nervous system stimulatory activity, thus indicating their usefulness as analeptic and antiappetite (anorexigenic) agents. The compounds are effective at dose levels of 5–20 mg. per kg. of body weight upon subcutaneous administration, and the toxic dose (LD$_{50}$) is about three times the effective dose.

The compounds of the invention can be prepared for parenteral, e. g. intramuscular, administration by dissolving under sterile conditions a salt form of the compounds in water (or an equivalent amount of a non-toxic acid if the free base is used), or in a physiologically compatible aqueous medium such as saline. Alternatively, they can be incorporated in tablet or capsule form with conventional excipients for oral administration.

I claim:
1. A compound selected from the group consisting of compounds having the formula

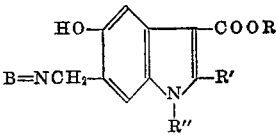

wherein R and R' are lower-alkyl groups, R'' is selected from the group consisting of hydrogen, lower-alkyl, and phenyl-lower-alkyl groups, and B=N is a basic tertiary-amino group selected from the group consisting of di-lower-alkylamino, 1-piperidyl, 1-pyrrolidyl and 4-morpholinyl groups, and lower-alkylated derivatives of the latter three; and acid-addition salts thereof.

2. 2 - lower - alkyl - 3 - carbo - lower - alkoxy - 5 - hydroxy-6-di(lower-alkyl)aminomethylindole.

3. 1 - lower - alkyl - 2 - lower - alkyl - 3 - carbo - lower-alkoxy-5-hydroxy-6-di(lower-alkyl)aminomethylindole.

4. Acid-addition salt of a 1-lower-alkyl-2-lower-alkyl-3 - carbo - lower - alkoxy - 5 - hydroxy - 6 - di(lower-alkyl)aminomethylinodole.

5. 1 - (phenyl - lower - alkyl) - 2 - lower - alkyl - 3-carbo - lower - alkoxy - 5 - hydroxy - 6 - di(lower - alkyl)-aminomethylindole.

6. 2-lower-alkyl-3-carbo - lower - alkoxy-5-hydroxy-6-dimethylaminomethylindole.

7. 1-lower-alkyl - 2 - lower-alkyl-3-carbo-lower-alkoxy-5-hydroxy-6-dimethylaminomethylindole.

8. Acid-addition salt of a 1-lower-alkyl-2-lower-alkyl-3-carbo - lower - alkoxy-5-hydroxy-6-dimethylaminomethylindole.

9. 1-(phenyl-lower-alkyl) - 2 - lower-alkyl-3-carbo-lower-alkoxy-5-hydroxy-6-dimethylaminomethylindole.

10. 2 - methyl-3-carbethoxy - 5 - hydroxy-6-dimethylaminomethylindole.

11. 1,2-dimethyl - 3 - carbethoxy-5-hydroxy-6-dimethylaminomethylindole.

12. An acid-addition salt of 1,2-dimethyl-3-carbethoxy-5-hydroxy-6-dimethylaminomethylindole.

13. 1,2-dimethyl-3-carbethoxy - 5 - hydroxy-6-dimethylaminomethylindole hydrochloride.

14. 1-benzyl-2-methyl - 3 - carbethoxy-5-hydroxy-6-dimethylaminomethylindole.

15. 1-hexyl-2-methyl - 3 - carbethoxy-5-hydroxy-6-dimethylaminomethylindole.

16. A process for preparing a compound having the formula

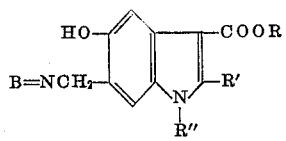

wherein R and R' are lower-alkyl groups, R'' is selected from the group consisting of hydrogen, lower-alkyl, and phenyl-lower-alkyl groups, and B=N is a basic tertiary-amino group, which comprises reacting a compound having the formula

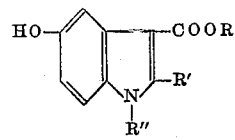

with formaldehyde and a basic secondary amine.

17. The process for preparing a 1-lower-alkyl-2-lower-alkyl-3-carbo-lower-alkoxy-5-hydroxy - 6 - tertiary-aminomethylindole in which the tertiary-amino group is basic in character, which comprises reacting a 1-lower-alkyl-2-lower-alkyl-3-carbo - lower - alkoxy-5-hydroxyindole with formaldehyde and a basic secondary amine.

18. The process for preparing a 1-lower-alkyl-2-lower-alkyl-3-carbo - lower - alkoxy-5-hydroxy - 6 - di(lower-alkyl)-aminomethylindole which comprises reacting a 1-lower-alkyl-2-lower - alkyl - 3 - carbo-lower-alkoxy-5-hydroxyindole with formaldehyde and a di-lower alkylamine.

19. The process for preparing a 1-lower-alkyl-2-lower-alkyl-3-carbo - lower - alkoxy - 5 - hydroxy-6-dimethylaminomethylindole which comprises reacting a 1-lower-alkyl-2-lower-alkyl - 3 - carbo - lower-alkoxy-5-hydroxyindole with formaldehyde and dimethylamine.

20. The process for preparing 1,2-dimethyl-3-carbethoxy - 5 - hydroxy-6-dimethylaminoethylindole which comprises reacting 1,2-dimethyl-3-carbethoxy-5-hydroxyindole with formaldehyde and dimethylamine.

References Cited in the file of this patent
UNITED STATES PATENTS 2,704,763    Koehneke et al.          Mar. 22, 1955
2,707,187    Koehneke et al.          Apr. 26, 1955

UNITED STATES PATENT OFFICE
Certificate of Correction

Patent No. 2,852,527

September 16, 1958

Edgar Alfred Steck

It is hereby certified that error appears in the printed specification of the above numbered patent requiring correction and that the said Letters Patent should read as corrected below.

Column 1, under the formula appearing between lines 26 and 32, insert —I— as the number of the formula; column 2, line 1, for "F'" read —R'—; column 3, line 37, for "and 37%" read —of 37%—; column 5, line 44, for "-5-hydroxylindole" read —-5-hydroxyindole—; column 9, line 23, for "alkyl)aminomethylinodole" read —alkyl)-aminomethylindole—; column 10, line 40, for "-6-dimethylaminoethylindole" read —-6-dimethylaminomethylindole —.

Signed and sealed this 7th day of April 1959.

[SEAL]

Attest:
KARL H. AXLINE,
*Attesting Officer.*

ROBERT C. WATSON,
*Commissioner of Patents.*